United States Patent [19]

You et al.

[11] Patent Number: 5,151,120

[45] Date of Patent: * Sep. 29, 1992

[54] SOLID INK COMPOSITIONS FOR THERMAL INK-JET PRINTING HAVING IMPROVED PRINTING CHARACTERISTICS

[75] Inventors: Young S. You, Los Altos; John D. Meyer, Tracy, both of Calif.

[73] Assignee: Hewlett-Packard Company, Palo Alto, Calif.

[ * ] Notice: The portion of the term of this patent subsequent to Apr. 7, 2009 has been disclaimed.

[21] Appl. No.: 684,632

[22] Filed: Apr. 12, 1991

Related U.S. Application Data

[60] Continuation-in-part of Ser. No. 332,242, Mar. 31, 1989, abandoned, which is a division of Ser. No. 526,210, May 21, 1990, Pat. No. 5,065,167.

[51] Int. Cl.[5] ............................................. C09D 11/02
[52] U.S. Cl. ........................................ 106/27; 106/31; 106/266; 106/272
[58] Field of Search ................... 106/27, 31, 272, 266

[56] References Cited

U.S. PATENT DOCUMENTS

| | | | |
|---|---|---|---|
| 4,066,789 | 1/1978 | Mores et al. | 106/28 |
| 4,361,843 | 11/1982 | Cooke et al. | 106/27 |
| 4,390,369 | 6/1983 | Merritt et al. | 106/31 |
| 4,484,948 | 11/1984 | Merritt et al. | 106/31 |
| 4,490,728 | 12/1984 | Vaught et al. | 346/1.1 |
| 4,490,731 | 12/1984 | Vaught | 106/31 |
| 4,659,383 | 4/1987 | Lin et al. | 106/27 |
| 4,745,420 | 5/1988 | Gerstenmaier et al. | 346/140 |
| 4,751,528 | 6/1988 | Spehrley, Jr. et al. | 346/1.1 |
| 4,758,276 | 7/1988 | Lin et al. | 106/27 |
| 4,776,887 | 10/1988 | Kuroda et al. | 106/31 |
| 4,793,264 | 12/1988 | Lin et al. | 106/27 |
| 4,797,692 | 1/1989 | Ims | 106/20 |
| 4,801,473 | 1/1989 | Creagh et al. | 427/164 |
| 4,851,045 | 7/1989 | Taniguchi | 106/31 |
| 4,878,946 | 11/1989 | Tabayashi et al. | 106/20 |
| 5,006,170 | 4/1991 | Schwarz et al. | 106/27 |
| 5,021,802 | 6/1991 | Allred | 106/20 |

FOREIGN PATENT DOCUMENTS 308117A 9/1987 European Pat. Off. .

*Primary Examiner*—Mark L. Bell
*Assistant Examiner*—Helene Klemanski

[57] ABSTRACT

Disclosed is an ink-jet composition including an organic carrier that is solid at 25° C. and liquid at the operating temperature of an ink-jet nozzle and a driver having a critical pressure greater than 10 atmospheres, the carrier and driver being miscible in liquid phase. The ink-jet composition is characterized by a viscosity of less than 15 centipoise at 90° C. and a surface tension of between about 20 to about 25 dynes per centimeter at 90° C. The ink-jet compositions disclosed herein are particularly useful in thermal ink-jet printing using thermally induced vapor bubbles to eject ink droplets from the printer and onto a substrate.

8 Claims, No Drawings

SOLID INK COMPOSITIONS FOR THERMAL INK-JET PRINTING HAVING IMPROVED PRINTING CHARACTERISTICS

CROSS-REFERENCE TO RELATED APPLICATIONS

This application is a continuation-in-part of U.S. Ser. No. 07/332,242, filed Mar. 31, 1989, now abandoned which is incorporated herein by reference in its entirely. U.S. Ser. No. 07/526,210, filed May 21, 1990, now U.S. Pat. No. 5,065,167, is in turn a Divisional Application based on U.S. Ser. No. 07/332,242.

BACKGROUND OF THE INVENTION

1. Field of the Invention

The present invention is directed to ink-jet compositions particularly solid ink-jet compositions for use in thermal ink-jet printers. Specifically, the present invention is directed to solid ink-jet compositions for use in thermal ink-jet printing using thermally induced vapor bubbles which compositions are formulated so as to provide improved printing characteristics including greater control of the solid ink dot height on the absorbing surface, i.e. the substrate.

2. State of the Art

In thermal ink-jet printing, solid ink-jet compositions are typically employed. These compositions typically employ an ink which is normally a solid at room temperature and which is capable of a phase change at elevated temperatures. When the ink is heated, the ink melts to form a fluid which can be ejected from the printer as droplets onto a substrate for marking whereupon it resolidifies by freezing on the marked substrate. Because of their nature of operation, such ink compositions are termed "hot melt inks" which term is art recognized to define an ink which is in a solid phase at room temperature and in a fluid phase at the operating temperature, i.e., a temperature above the melting temperature of the waxy component of the ink. Most solid ink-jet compositions reported so far have involved one phase change, that is, from solid at room temperature to liquid at operating temperatures.

Solid ink-jet compositions can be used in thermal ink-jet printing utilizing thermally induced vapor bubbles as a driving force to eject ink drops out of the nozzle of the jet printer and onto the substrate. When so used, the composition is sometimes referred to herein as a thermal ink-jet ink composition. In this case, a portion of the solid ink in the printing head is first liquified and then a portion of the liquified ink is vaporized so as to generate a bubble which is used to force the ink from the printer head and onto the substrate.

Thermal ink-jet ink compositions generally contain a carrier, a driver and a colorant. The carrier is an organic material which carries the colorant(s) and which is a solid at 25° C. and a liquid at the operating temperature of the printer head. The driver is a bubble-forming substance which can provide enough driving force to eject ink drops from the print head or nozzle. The colorant can be a dye or pigment, which is soluble in the carrier and which produces the visible printed images on the substrate. Upon contact with the surface of the substrate, the ink composition rapidly freezes to form an ink dot which imparts a mark onto the substrate.

However, with regard to such solid ink compositions, a problem exists with regard to the formation of raised dots of ink droplet forming on the substrate surfaces. These raised dots arise from the instant freezing of the ink droplet on the substrate surface and the resulting lack of spreading of the droplet on the surface. The raised dots are aesthetically unacceptable since they can result in images with an embossed characteristic. Additionally, when the raised ink dots becomes too high, the raised dot may have poor adhesion to the substrate or may easily be scraped off or flake off from the substrate by action of folding or creasing of the substrate or may be subject to smearing or offsetting to other sheets.

The reduction of the height of such raised dots can be achieved by incorporating a sufficient amount of a penetrate into the ink composition. However, the use of such penetrates can result in the dye in the ink being carried unevenly into the pores of certain substrates, e.g., paper, by capillary action which in turn leads to feathering, i.e., the undesired diffusion of the dye which results in the dot becoming fuzzy. This, in turn, results in poor print quality.

Other heretofore known means for reducing dot height include the procedures disclosed in U.S. Pat. Nos. 4,745,420; and 4,801,473; and European Patent Application Pub. No. 308 117A. In particular, U.S. Pat. No. 4,745,420 discloses passing the marked substrate through rollers in order to minimize the height of such raised dots. Likewise, U.S. Pat. No. 4,801,473 discloses the use of a liquid coating applied to the surface of the marked substrate which wets the surface of the substrate as well as the ink dots. The coating apparently reduces dot height by increasing the surface area of the dot. Also, European Patent Application Pub. No. 308 117A discloses that the initially formed dots in a solid state can be flattened by heating the substrate and then subsequently cooling it. However, as can be seen, each of these other procedures requires a separate post-treatment step to reduce dot height which imparts an additional level of complexity to the printing process.

In View of the above, solid ink-jet compositions formulated to reduce dot height without resulting in feathering would provide an important advance in the art of thermal ink-jet printing.

In this regard, the present invention is directed to the discovery that solid ink-jet compositions meeting defined criteria including a specified surface tension range and a defined viscosity range permit the application of printed dots of reduced dot height without causing feathering provided that the printer head is operated at defined temperature differentials from the melting point of the ink and from the temperature of the substrate.

Specifically, the present invention is directed to the discovery that in thermal ink-jet printing utilizing thermally induced vapor bubbles, solid ink-jet compositions which are formulated to have less than a specified maximal surface tension will result in reduced dot height as compared to the dot height resulting from the use of ink compositions having a surface tension greater than that described herein. Likewise, when the herein described compositions are also formulated to have greater than a specified minimal surface tension, then the resulting ink composition achieves such reduced dot height without causing feathering of the dot into the substrate.

The above discovery is particularly surprising in view of the fact that, in oil based inks, ink compositions with too low of a surface tension result in poor print quality. See, for instance, Lin et al., U.S. Pat. No. 4,758,276. Further in this regard, Cooke et al., U.S. Pat. No. 4,361,843, discloses that acceptable print quality is achieved by oil based inks employing oleic acid when the surface tension of the ink is greater than 35 dynes per centimeter.

With regard to the defined criteria concerning viscosity and the defined temperature differentials, the present invention is directed to the discovery that these criteria are also essential to achieving reduced dot height.

SUMMARY OF THE INVENTION

The present invention is directed to the discovery that solid ink-jet compositions formulated to have a surface tension within a defined range and a viscosity within a defined range provide for ink compositions which result in reduced dot height and without causing feathering when an ink droplet is applied to a substrate by vapor bubble ejection from the print head of a thermal ink-jet printer; provided that the print head is operated at defined temperature differentials from the melting point of the ink composition and from the temperature of the substrate. Additionally, the solid ink-jet compositions of this invention are also formulated to specified criteria with regard to the critical pressure of the driver in order to effect efficient printing.

Specifically, in one of its composition aspects, the present invention is directed to an ink-jet composition comprising a carrier that is solid at 25° C. and liquid at the operating temperature of an ink-jet, a driver which is miscible with said carrier and which has a critical pressure of at least 15 atmospheres, and a colorant wherein said composition is a solid at 25° C., has a viscosity at 90° C. of 15 centipoise or less and has a surface tension at 90° C. of from about 20 to about 25 dynes per centimeter.

In one of its process aspects, the present invention is directed to a process for applying an ink composition to a substrate via an ink-jet which contains a printer head having an inlet for receiving a portion of the ink composition and an ejection nozzle for applying a drop of the ink composition onto the substrate and which ink composition comprises a carrier that is solid at 25° C. and liquid at the operating temperature of an ink-jet, a driver which is miscible with said carrier and which has a critical pressure of at least 15 atmospheres, and a colorant wherein said ink composition is a solid at 25° C., has a viscosity at 90° C. of 15 centipoise or less and a surface tension of from about 20 to about 25 dynes per centimeter at 90° C. wherein said process comprises:

passing a portion of said ink composition to the inlet of said ink-jet printer head;

heating said composition in the ink-jet printer head so as to form a droplet of liquid ink adjacent to the ejection nozzle;

superheating said driver within said print head in an area immediately behind said droplet and nucleating said superheated driver;

ejecting said droplet from the printer head via the ejection nozzle and onto the substrate so as to form a marked substrate, wherein the temperature differential between the operating temperature of the print head and the melting point of the ink composition is at least 10° C. and further wherein the temperature differential between the operating temperature of the print head and the temperature of the substrate is less than 100° C.

In another of its process aspects, the present invention is directed to a process for reducing the height of an ink dot applied to a substrate by an ink-jet printer which process comprises the steps of:

selecting an ink composition comprising a carrier that is solid at 25° C. and liquid at the operating temperature of an ink-jet, a driver which is miscible with said carrier and which has a critical pressure of at least 15 atmospheres, and a colorant wherein said ink composition is a solid at 25° C., has a viscosity at 90° C. of 15 centipoise or less, and a surface tension at 90° C. of from about 20 to about 25 dynes per centimeter;

adding said ink composition to said ink-jet printer; and applying an ink dot formed from said composition to said substrate wherein the temperature differential between the operating temperature of the print head and the melting point of the ink composition is at least 10° C. and further wherein the temperature differential between the operating temperature of the print head and the temperature of the substrate is less than 100° C.

DETAILED DESCRIPTION OF THE INVENTION

The present invention is directed to solid ink jet compositions that greatly mitigate the problems arising with dot height as well as methods directed to the use of such compositions. The ink-jet compositions of this invention comprise three components, namely a carrier, a driver and a colorant. These compositions are formulated so as to meet defined criteria with regard to surface tension properties and viscosity properties, whereas the driver employed is selected to meet defined criteria with regard to critical pressure. When so formulated, the herein described compositions provide reduced dot size without resulting in feathering. However, prior to describing this invention in detail, the following terms will first be defined.

The term "carrier" refers to any organic material which is a solid at 25° C. and which carries the colorants, i.e., the colorants are soluble in the carrier. Suitable carriers include waxes, plastics, polymers, oligomers and the like. The carrier must be liquid at the operating temperature of the printer jet. Because the carriers and ink compositions which are useful for this invention may not have sharply defined melting points, the term "liquid" as used herein and as applied to the carrier and/or ink composition includes the carriers and ink compositions in a condition in which they can flow through a printing jet and the term "melting point" refers to the lowest temperature of the carrier and/or ink composition which permits them to flow through a printing jet. In this regard, in order to prevent premature freezing of the ink-jet composition onto the substrate which can cause, among other things, raised dots on the substrate, clogging and/or crusting of the ink in the ink-jets, the temperature differential between the operating temperature of the print head and the melting point of the solid ink composition should be at least 10° C., preferably at least 20° C. That is to say that the ink composition should melt at least 10° C., preferably at least 20° C., below the operating temperature of the printer head. Additionally, as noted below, the temperature differential between the operatinq temperature of the printer head and the temperature of the substrate should not be more than 100° C. and preferably, not more than 80° C. That is to say that the operating temperature of the print head should be no more than 100° C. and preferably, no more than 80° C. above the temperature of the substrate.

The material selected as the carrier should not introduce other problems into the thermal ink-jet composition. For example, the carrier should be stable at the temperature of the printing process, it should not chemically react with those portions of the structure that it contacts nor should it crust and/or clog in the ink-jets and it should not be poisonous or otherwise noxious. The carrier can be a mixture of materials.

When the carrier has a critical pressure of greater than 10 atmospheres and preferably greater than 15 atmospheres and a boiling point of less than 300° C., the carrier can also serve in the capacity of the driver. That is to say that when a suitable carrier meets these defined criteria with regard to critical pressure and boiling point, then the carrier can simultaneously perform the functions of both the carrier, i.e., a carrier of the colorants, and the driver, i.e., a bubble-forming substance. Carriers which can function as both the carrier and the driver include fatty acids, long chain alcohols, and fatty acid esters meeting the defined criteria with regard to critical pressure and melting temperature.

Suitable carriers meeting these criteria so as to perform both functions include fatty acids, long chain alcohols and fatty acid esters having at least 5 carbon atoms and preferably from about 14 to about 40 carbon atoms. Preferred fatty acids include stearic acid, palmitic acid, myristic acid, behenic acid, and tridecanoic acid. Preferred long chain alcohols include octadecanol, hexadecanol and tetradecanol. Preferred fatty acid esters include monoethylstearate, diethylstearate and monoethylpalmitate.

Carriers containing a mixtures of components can also be used to perform both functions. In such cases, at least one of the components of the mixture must have a critical pressure of at least 10 atmospheres and preferably, at least 15 atmospheres, and a boiling point of about 300° C. or less which permits the formation of explosive vapor bubbles at the conditions of the ink head.

When using an ink-jet composition wherein the carrier and the driver are the same material, it is preferred to produce the vapor bubble with a multi-part electrical pulse, with (a) the first pulse or pulses (precursor pulses) heating the driver without nucleating a bubble, and (b) the final pulse or pulses (kicker pulses) quickly heating the driver to a temperature near its superheat limit, a temperature at which molecular movement is so great that the probability of homogeneous nucleation of a bubble Within a fluid approaches unity.

The multi-part heating may be accomplished with two or a train of three or more pulses. This multi-part heating system causes rapid nucleation and explosive bubble formation to drive the ink through the jet. Control of the timing of the nucleation pulses and the rate of ink flow through the jet produces ink drops that are the correct size to produce high quality print on the substrate. Such control is within the skill of the art.

Vaporization of the driver occurs within a drop ejection channel in the printing head and behind that portion of the thermal ink-jet composition that is to be expelled from the ink-jet by the expansion of the bubble. The temperature of the ink to be expelled is such that the ink is liquid when it is ejected from the nozzle onto the substrate.

Heretofore, most materials used as the carrier for solid inks have such low critical pressures and/or high boiling points at the operating temperature of the printer that they are not suitable for use as both the carrier and the driver. In such cases, the thermal ink-jet ink compositions of this invention will include a separate driver. In this case, the only criteria necessary for these carriers is that it be any organic material which is a solid at 25° C., liquid at the operating temperatures of the printer jet, and which carries the colorants, i.e., the colorants are soluble in the carrier. Accordingly, a much greater deal of latitude is permitted in the selection of the carrier when a separate driver is employed.

The term "driver" refers to a bubble-forming substance, which can provide enough driving force to eject ink drops from the print head or nozzle. The driver is chosen so as to be compatible (miscible) with the carrier. Additionally, the material selected as the driver should not introduce other problems into the solid ink-jet composition. For example, the driver should be stable at the temperature of the printing process, it should not chemically react with those portions of the structure that it contacts nor should it crust in the ink-jets and it should not be poisonous or otherwise noxious.

In order to function properly as a driver, the driver should have a boiling point of about 300° C. or less and more specifically, from about 100° C. to 300° C., should have a vapor pressure of less than about 0.04 atmospheres at 20° C., and should have critical pressure of greater than 10 atmospheres and preferably greater than 15 atmospheres.

In particular, the ink composition containing the driver is generally heated by a resister which achieves a maximum temperature of about 300°–400° C. when electric pulses are passed through. Accordingly, if the driver has a boiling point of greater than about 300° C., then explosive formation of a bubble may not form under these conditions. On the other hand, if the driver has too low of a boiling point (i.e., less than about 100° C.), then it becomes more difficult to control bubble formation. Accordingly, the driver should have a boiling point between 100° C. and 300° C. and preferably between 180° C. and 250° C. and more preferably, between 210° C. and 225° C.

Additionally, since the ink-jet composition is stored in the printer as a solid at room temperature, the long term stability of such compositions requires that the driver also possess a relatively low vapor pressure at room temperature. That is to say that if the driver possesses a high vapor pressure at room temperature, then sufficient driver could evaporate from the composition over time so as to impair the long term ability of the composition to function in thermal ink-jet printers employing a thermally induced vapor bubble. Accordingly, when a separate driver is employed, the driver preferably should have a vapor pressure at 20° C. of less than about 0.04 atmospheres and preferably less than about 0.025 atmospheres. In an even more preferred embodiment, the driver is chosen so that the vapor pressure remains relatively low until the boiling point of the driver is approached.

Lastly, as noted above, suitable drivers have a critical pressure of greater than 10 atmospheres and preferably greater than 15 atmospheres. Such high critical pressures permit the driver to be highly superheated so that bubble nucleation occurs rapidly to efficiently drive the ink composition from the jets.

The specific driver chosen is not critical provided it meets the above-defined criteria. Suitable driver include, for example, $C_4$ to $C_{18}$ alcohols, $C_2$ to $C_{16}$ polyols, $C_4$ to $C_{18}$ glycol ethers, and the like provided that the driver meets the above-noted criteria. Mixtures of these can be used and even mixtures of the above with water, as long as there is insufficient water present to form a separate phase. Preferred alcohols include, for example, hexyl alcohol, octyl alcohol, benzyl alcohol, among others. Preferred polyols include, for example, ethylene glycol, propylene glycol, 1,2-propanediol, 1,3-propanediols, and 2,3-butanediol. Glycol ethers that may be employed include diethylene glycol, ethylene glycol monomethyl ether, and propylene glycol monomethyl ether, among others. Other suitable drivers include materials which are solid at room temperature and have a boiling point of less than 300° C. Such drivers include, for example, propionamide, isobutyroamide, and the like. Such drivers are disclosed in U.S. Ser. No. 671,590 (filed on Mar. 19, 1991, and entitled Solid Driver For The Solid Ink Jet Ink) which application is incorporated hereby reference.

The term "vehicle" defines a combination of all of the components involved in solid ink except the colorant.

The term "colorant" refers to a dye or pigment; which is soluble in the carrier and which produces the visible printed images on the substrate. The particular dye or pigment employed is not critical provided that the dye is stable at the temperature of the printing process, does not chemically react with those portions of the structure that it contacts and is not poisonous or otherwise noxious. Suitable dyes or pigments include those heretofore used in solid inks including, for example, Morfast 101 (available from Morton Thiokol) Neptune Red (available from Morton Thiokol) and the like.

The term "substrate" refers to the material onto which the ink dot is applied. Suitable substrates are well known in the art and include, for example, paper, polyester, cloth, cardboard, and the like.

"Ink-jet compositions" refer to ink compositions containing the vehicle and the colorant which can be used in thermal ink-jet printers utilizing thermally induced vapor bubbles to eject the ink onto the substrate.

When the carrier and the driver are the same, such compositions preferably comprise a carrier containing at least about 0.5 weight percent of a colorant and from about 70 to about 99.5 weight percent of a carrier based on the total weight of the composition. Even more preferably, such compositions comprise from about 0.5 to about 5 weight percent of a colorant. Additionally, such compositions can contain one or more additives which enhance the ink with regard to (i) improved solubility of other components, (ii) improved print quality, (iii) improved adhesion of the ink to the media, (iv) control of wetting characteristics, which may be related to such properties as surface tension and viscosity, and (v) improve the mechanical properties of the ink, among other properties. Such additives are well known in the art. When employed, the total of these additives generally comprise no more than about 30 weight percent of the weight of the total composition.

When a separate driver is employed, such compositions are formulated to contain at least 5 weight percent of a driver. Preferably, such compositions comprise at least about 5 weight percent of a driver, at least about 0.5 weight percent of a colorant, and from about 30 to about 94.5 weight percent of a carrier based on the total weight of the composition. Even more preferably, such compositions comprise from about 5 to about 30 weight percent of a driver, and from about 0.5 to about 5 weight percent of a colorant based on the total weight of the composition. Additionally, such compositions can contain one or more additives which enhance the ink with regard to (i) improved solubility of other components, (ii) improved print quality, (iii) improved adhesion of the ink to the media, and (iv) control of wetting characteristics, which may be related to such properties as surface tension and viscosity, (v) improve the mechanical properties of the ink, among other properties. Such additives are well known in the art. When employed, the total of these additives generally comprise no more than about 50 weight percent of the weight of the total composition.

Compounds that form the carrier or the driver may also function as additives. Dodecyl alcohol may be an additive to improve the ability of the ink to wet the medium. Octadecanol and stearic acid may be separate additives to improve adhesion or they may act as additives and form all or part of the carrier.

The central aspect of the present invention is the discovery that dot height size can be reduced by specifically formulating the ink-jet ink composition to have a viscosity of less than 15 centipoise at 90° C. and a surface tension of from about 20 to about 25 dynes per centimeter at 90° C. The particularly preferred composition has a viscosity of less than 10 centipoise at 90° C. and a surface tension of about 20 dynes per centimeter at 90° C. and a melting point of less than about 90° C. Solid ink compositions meeting these defined criteria will produce acceptable dot height, about 1 mil or less, when the temperature differential between the operating temperature of the print head and the melting point of the ink composition is at least 10° C. and also when the temperature differential between the operating temperature of the print head and the temperature of the substrate is less than 100° C.

The viscosity of the formulated composition at 90° C. can be controlled by the appropriate selection of the carrier and, if employed, the driver. Such selection is within the skill of the art. Ink compositions meeting defined criteria with regard to viscosity define ink compositions which will flow smoothly and rapidly at the operating temperature of the print head and accordingly, will not interfere with efficient printing operations.

On the other hand, if the formulated ink composition has a surface tension greater than 25 dynes per centimeter at 90° C., one or more additives can be added to the composition to reduce the surface tension value to between 20 and 25 dynes per centimeter. Such additives include surfactants, alcohols, and the like which are well known for enhancing spreadability. Without being limited to any theory, it is believed that the reduction in surface tension to about 25 dynes per centimeter or less at 90° C. enhances the spreadability of the ink dot as it contacts the substrate which, in turn, leads to reduced dot height. It is further believed that by maintaining a surface tension of at least about 20 dynes per centimeter at 90° C., the spreadability of the composition is sufficiently controlled so as to avoid feathering. This is particularly surprising insofar as heretofore known oiled and water based ink compositions specifically required high surface tension in order to achieve acceptable print quality, e.g., surface tension values of greater than 35 dynes per centimeter for oil based inks employing oleic acid.

This is the appropriate point to note that the viscosity and surface tension values recited herein are recited at 90° C. only for a point of reference and are not to be inferred that operating temperatures other than 90° C. cannot be used. As it is well known in the art, both viscosity and surface tension values are variables depending on the temperature. Accordingly, if other operating temperatures are employed, the surface tension and viscosity values at the operating temperature will be different from that found at 90° C. However, solid ink compositions meeting the defined criteria at 90° C. will also provide for acceptable dot height at such other operating temperatures; provided of course that the above-defined temperature differentials are maintained.

The ink composition of this invention is prepared by combining all of the ingredients and generally mixing the components at a temperature above the melt point of the carrier until a homogeneous mixture is achieved. The composition is then cooled to provide for a solid ink composition of this invention.

The ink composition of this invention is employed in thermal ink-jet printing using thermally induced vapor bubbles to eject ink droplets from the printer onto the substrate. The specific thermal ink-jet printer employed is not critical and does not form a part of this invention. However, suitable ink-jet printers include those disclosed by Vaught et al., U.S. Pat. No. 4,490,728, which disclosure is incorporated herein by reference. Other suitable zo ink-jet printers include SI 480 (commercially available from DataProducts, Woodland Hills, CA), Pixelmaster (commercially available from Howtech, Hudson, NH 03051), and the like.

In regard to such printers, the difference between the operating temperature of the print head and the temperature of the substrate should be no more than 10° C., and preferably no more than 80° C. In particular, when this temperature differential is greater than 100° C., then the cooling gradient of the ejected ink drop is so great that it is not possible to control ink height. In this regard, the temperature of the substrate can be adjusted to within 100° C. of the operatinq temperature of the print head by heating the substrate. Methods for heating the substrate are well known in the art.

The following examples are offered to illustrate the present invention and are not to be construed in any manner as limiting it.

EXAMPLES

Comparative Example A

A prior art solid ink composition was prepared for comparative purposes. This composition was prepared from stearic acid and had the characteristics set forth below:

|  | Composition | Weight % |
| --- | --- | --- |
| Carrier: | Stearic acid | 100% |
| Colorant (dye): | — | — |

The ink of Comparative Example A is a colorless (white) ink and represents an ink which can be used in thermal ink-jet printers. This ink has a viscosity of less than 15 centipoise at 90° C. and a surface tension of about 28 dynes per centimeter and accordingly, in view of this surface tension, is not a composition within the scope of this invention.

The ink of Comparative Example A was applied to a black substrate by a conventional bubble driver ink-jet printer which employed electric resistance heaters. Insofar as the ink was not highly volatile, a multipulse heating procedure was required to obtain rapid nucleation of the solvent bubble. The electric resistance heaters had a resistance of about 26 ohms. The precursor pulse of 380 mA had a duration of 80 microsec and the kicker pulse of 520 mA has a duration of 5 microsec. The printer head was operated such that the temperature differential between the melting point of the ink composition and the operating temperature of the print head was more than 10° C. and the temperature differential between the operating temperature of the print head and the temperature of the substrate was less than 100° C.

When applied to a substrate, the ink of Comparative Example A produced embossed characteristics evidencing the fact that the dot height produced by this composition was too high. In fact, when measured, the height of the ink dot produced by this composition was about 3 mils.

EXAMPLE 1

A solid ink composition of this invention was prepared and had the following characteristics:

|  | Composition | Weight % |
| --- | --- | --- |
| Carrier: | Stearic acid | 55 |
| Driver: | Neopentyl alcohol | 15 |
|  | 2,3-Butanediol | 15 |
| Colorant (dye): | Morfast 101 (liquid) (Morton Thiokol) | 15 |

The ink of Example 1 was found to have a viscosity of about 4 centipoise at 90° C. and a surface tension of about 23 dynes per centimeter and accordingly, is an ink composition within the scope of this invention. In this regard, it is seen that the addition of the neopentyl alcohol and 2,3-butanediol have reduced the surface tension of the ink composition as compared to that of Comparative Example A.

The ink of Example 1 was used in a conventional bubble driver ink-jet printer in which electric resistance heaters vaporized the driver. The heaters were operated at a resistance of about 26 ohms and used a single stage heating pulse of 450 mA (milliamperes) for a period of 6 microsec (microseconds). The printer head was operated such that the temperature differential between the melting point of the ink composition and the operating temperature of the print head was more than 10° C. and the temperature differential between the operating temperature of the print head and the temperature of the substrate was less than 100° C.

The ink produced a sharp, black image on paper which was water resistant. Additionally, the ink dot height size produced by this composition did not produce embossed characteristics evidencing that the dot height produced by this composition has been reduced as compared to Comparative Example A. In fact, when measured, the height of the ink dot produced by this composition was less than 1 mil.

The above data demonstrates that the ink compositions of this invention meeting the defined criteria with regard to surface tension and viscosity provide for reduced dot height as compared to a prior art composition not meeting this criteria.

EXAMPLE 2

A second solid ink composition of this invention was prepared and had the following characteristics:

|  | Composition | Weight % |
|---|---|---|
| Carrier: | 1-octadecanol | 55 |
| Driver: | Neopentyl alcohol | 15 |
|  | 2,3-butanediol | 15 |
| Colorant (dye): | Morfast 101 (liquid) (Morton Thiokol) | 15 |

The ink of Example 2 was found to have a viscosity of about 4 centipoise at 90° C. and a surface tension of about 23 dynes per centimeter and accordingly is an ink composition of this invention.

The ink of Example 2 was also used in the printer of Example 1 in a one pulse printing process at the same conditions of Example 1. The ink of Example 2 also produced a sharp, black image on paper which Was water resistant; additionally, the height of the ink dot produced by this composition was sufficiently small so as not to produce embossed characteristics.

In addition to the above formulations, other solid ink compositions meeting the defined criteria with regard to melting point, viscosity, surface tension and the like, can be used in the practice of this invention. For example, a formulation containing 15 weight percent of neopentyl alcohol, 15 weight percent 2,3-butanediol, 3–10 weight percent of a dye (Morofast 101 black dye) and 60–70 weight percent of stearic acid or durawax, i.e., Durawax C, will produce solid ink compositions within the scope of this invention. Likewise, the use of a solid carrier having a viscosity of less than 15 centipoise at 90° C., a surface tension of between 20 and 25 dynes per centimeter, and a boiling point of less than 300° C. can function both the carrier and the driver without the need to add additional components other than the colorant. Such carriers include palmitic acid, myristic acid, behenic acid, tridecanoic acid, octadecanol, hexadecanol, tetradecanol, monoethylstearate, diethylstearate and monoethylpalmitate, and the like.

When the driver employed is not highly volatile as in the case where the driver and the carrier are the same, to obtain rapid nucleation of the solvent bubble a multipulse heating procedure can be employed. One such procedure employs electric resistance heaters having a resistance of about 26 ohms and utilizes both a precursor pulse to transform a portion of the solid ink into a liquid and a kicker pulse to form a bubble. Suitable precursor pulses of 380 mA for a duration of 80 microsec and suitable kicker pulses of 520 mA for a duration of 5 microsec have been bound satisfactory.

What is claimed is:

1. An ink-jet composition comprising:
   from about 30 to about 94.5 weight percent of a carrier that is solid at 25° C. and liquid at the operating temperature of an ink-jet;
   at least about 5 weight percent of an added driver which is miscible with said carrier and which has a critical pressure of at least 15 atmospheres, a boiling point of from about 100° C. to about 300° C. and a vapor pressure at 20° C. of less than about 0.04 atmospheres; and
   from about 0.05 to about 5 weight percent of a colorant
   wherein said composition is a solid at 25° C., has a viscosity at 90° C. of 15 centipoise or less and has a surface tension at 90° C. of from about 20 to about 25 dynes per centimeter.

2. The ink composition according to claim 1 wherein said driver has a boiling point of between 180° C. and 250° C.

3. The ink composition according to claim 1 wherein said driver has a vapor pressure at 20° C. of less than 0.025 atmospheres.

4. The ink composition according to claim 1 wherein said driver is selected from the group consisting of $C_4$ to $C_{18}$ alcohols, $C_2$ to $C_{10}$ polyols, and $C_4$ to $C18$ glycol ethers.

5. The ink composition according to claim 4 wherein said driver is one or more $C_4$ to $C_{18}$ a alcohols.

6. The ink composition according to claim 4 wherein said driver is one or more $C_2$ to $C_{18}$ polyols.

7. The ink composition according to claim 4 wherein said driver is one or more $C_4$ to $C_{18}$ glycol ethers.

8. The ink composition according to claim 4 wherein said driver is selected from the group consisting of hexyl alcohol, octyl alcohol, benzyl alcohol, ethylene glycol, propylene glycol, 1,2-propanediol, 1,3-propanediols, 2,3-butanediol, diethylene glycol, ethylene glycol monomethyl ether, and propylene glycol monomethyl ether.

* * * * *